United States Patent
Gearty et al.

(10) Patent No.: US 6,408,381 B1
(45) Date of Patent: Jun. 18, 2002

(54) MECHANISM FOR FAST ACCESS TO CONTROL SPACE IN A PIPELINE PROCESSOR

(75) Inventors: Margaret Gearty, Bathford Bath (GB); Chih-Jui Peng, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,926

(22) Filed: Oct. 1, 1999

(51) Int. Cl.⁷ .............................................. G06F 9/30
(52) U.S. Cl. ...................................................... 712/225
(58) Field of Search ................................ 712/209, 225, 712/233

(56) References Cited

U.S. PATENT DOCUMENTS

| | | | |
|---|---|---|---|
| 4,814,981 A | 3/1989 | Rubinfeld | 364/200 |
| 5,142,634 A | * 8/1992 | Fite et al. | 712/240 |
| 5,251,311 A | 10/1993 | Kasai | 395/425 |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,596,734 A | 1/1997 | Ferra | 395/825 |
| 5,598,551 A | 1/1997 | Barajas et al. | 395/484 |
| 5,608,881 A | 3/1997 | Masumura et al. | 395/306 |
| 5,613,153 A | 3/1997 | Arimilli et al. | 395/821 |

(List continued on next page.)

FOREIGN PATENT DOCUMENTS

| | | | |
|---|---|---|---|
| EP | 0165600 B1 | 11/1991 | G06F/13/36 |
| EP | 0636976 B1 | 2/1995 | G06F/11/00 |
| EP | 0636976 A1 | 2/1995 | G06F/11/00 |
| EP | 0652516 A1 | 5/1995 | G06F/11/00 |
| EP | 0702239 A2 | 3/1996 | G01R/31/3173 |
| EP | 0720092 A1 | 7/1996 | G06F/11/00 |
| EP | 0933926 A1 | 8/1999 | H04N/5/00 |
| EP | 0945805 A1 | 9/1999 | G06F/12/08 |
| EP | 0959411 A1 | 11/1999 | G06F/13/24 |

(List continued on next page.)

OTHER PUBLICATIONS

Richard York; Real Time Debug for System–on–Chip Devices; Jun. 1999; pp. 1–6.
55356, Singapore, 9702738–7, Jul. 31, 1997, English.

Primary Examiner—David Y. Eng
(74) Attorney, Agent, or Firm—Townsend and Townsend and Crew LLP

(57) ABSTRACT

A method for low latency access to the control space. A pipeline processor executes instructions in multiple stages including a decode stage, one or more execution, stages, and a writeback stage. A control space access instruction includes a first field containing a control register specifier and a second field containing a general purpose register specifier. The decode stage is configured to decode the first and second fields and place the decoded contents on a global operand bus. The specified control register is addressed from the global operand bus while the access instruction is in decode. In the case of a read instruction, the addressed control register places its contents on the global operand bus while the instruction remains in decode. In the case of a write instruction, the general purpose register is addressed during the execution stage and its contents placed on the global operand bus during the writeback stage such that the contents of the addressed general purpose register are moved to the addressed configuration register during the writeback stage.

7 Claims, 9 Drawing Sheets

U.S. PATENT DOCUMENTS

| | | | |
|---|---|---|---|
| 5,627,842 A | 5/1997 | Brown et al. | 371/22.3 |
| 5,657,273 A | 8/1997 | Ayukawa et al. | 395/189.01 |
| 5,682,545 A | 10/1997 | Kawasaki et al. | 395/800 |
| 5,687,360 A * | 11/1997 | Chang | 712/240 |
| 5,699,537 A * | 12/1997 | Sharangpani et al. | 712/217 |
| 5,704,034 A | 12/1997 | Circello | 395/183.14 |
| 5,708,773 A | 1/1998 | Jeppesen, III et al. | 395/183.06 |
| 5,724,549 A | 3/1998 | Selgas et al. | 395/468 |
| 5,737,516 A | 4/1998 | Circello et al. | 395/183.14 |
| 5,742,780 A * | 4/1998 | Caulk | 712/206 |
| 5,751,621 A | 5/1998 | Arakawa | 364/748.07 |
| 5,768,152 A | 6/1998 | Battaline et al. | 364/551.01 |
| 5,771,240 A | 6/1998 | Tobin et al. | 371/22.1 |
| 5,774,701 A | 6/1998 | Matsui et al. | 395/556 |
| 5,778,237 A | 7/1998 | Yamamoto et al. | 395/750.04 |
| 5,781,558 A | 7/1998 | Inglis et al. | 371/21.1 |
| 5,796,978 A | 8/1998 | Yoshioka et al. | 395/416 |
| 5,828,825 A | 10/1998 | Eskandari et al. | 395/183.03 |
| 5,832,248 A | 11/1998 | Kishi et al. | 395/376 |
| 5,835,963 A | 11/1998 | Yoshioka et al. | 711/207 |
| 5,848,247 A | 12/1998 | Matsui et al. | 395/284 |
| 5,860,127 A | 1/1999 | Shimazaki et al. | 711/167 |
| 5,862,387 A | 1/1999 | Songer et al. | 395/728 |
| 5,867,726 A | 2/1999 | Ohsuga et al. | 395/800.32 |
| 5,884,092 A | 3/1999 | Kiuchi et al. | 395/800.35 |
| 5,896,550 A | 4/1999 | Wehunt et al. | 395/846 |
| 5,918,045 A | 6/1999 | Nishii et al. | 395/584 |
| 5,930,523 A | 7/1999 | Kawasaki et al. | 395/800.32 |
| 5,930,833 A | 7/1999 | Yoshioka et al. | 711/210 |
| 5,944,841 A | 8/1999 | Christie | 714/38 |
| 5,950,012 A | 9/1999 | Shiell et al. | 395/712 |
| 5,953,538 A | 9/1999 | Duncan et al. | 395/842 |
| 5,956,477 A | 9/1999 | Ranson et al. | 395/183.06 |
| 5,978,874 A | 11/1999 | Singhal et al. | 710/107 |
| 5,978,902 A | 11/1999 | Mann | 712/227 |
| 5,983,017 A | 11/1999 | Kemp et al. | 395/704 |
| 5,983,379 A | 11/1999 | Warren | 714/727 |
| 6,014,734 A * | 1/2000 | Tran et al. | 712/23 |

FOREIGN PATENT DOCUMENTS

| | | | | |
|---|---|---|---|---|
| JP | PCT/JP96/02819 | 9/1996 | | G06F/9/46 |
| JP | 8320796 A | 12/1996 | | G06F/9/46 |
| JP | 8329687 A | 12/1996 | | G11C/15/00 |
| JP | 9212358 A | 8/1997 | | G06F/9/38 |
| JP | 9311786 A | 12/1997 | | G06F/9/38 |
| JP | 10106269 A | 4/1998 | | G06F/12/08 |
| JP | 10124484 A | 5/1998 | | G06F/17/10 |
| JP | 10177520 A | 6/1998 | | G06F/12/10 |

* cited by examiner

| INFORMATION | SIZE | DESCRIPTION |
|---|---|---|
| RDEST | 6 | INDICATES WHICH DESTINATION THIS INSTRUCTION WILL WRITE. |
| E1_RESULT | 1 | INDICATES E1 STAGE WILL WRITE THE DESTINATION |
| E2_RESULT | 1 | INDICATES E2 STAGE WILL WRITE THE DESTINATION |
| E3_RESULT | 1 | INDICATES E3 STAGE WILL WRITE THE DESTINATION |
| LSU | 1 | INDICATES IF THIS STAGE CONTAINS AN LSU INSTRUCTION |
| STORE | 1 | INDICATES IF THIS STAGE CONTAINS A STORE INSTRUCTION |
| FPU | 1 | INDICATES IF THIS STAGE CONTAINS AN FPU INSTRUCTION |
| IMU_MAC | 1 | INDICATES IF THIS STAGE CONTAINS AN IMU-FORWARDING MAC-TYPE or MULTIPLIER-TYPE INSTRUCTION |
| WRITE_RF | 1 | INDICATES THIS STAGE CONTAINS AN INSTRUCTION THAT UPDATES A REGISTER FILE |
| WRITE_FPR | 1 | INDICATES THIS STAGE CONTAINS AN INSTRUCTION THAT UPDATES A FLOATING POINT REGISTER FILE |
| SERIALIZE | 1 | INDICATES THIS STAGE CONTAINS A SERIALIZING INSTRUCTION |
| ARCH_RDEST | 1 | INDICATES THE LATEST INSTRUCTION THAT UPDATE AN ARCHITECTURAL REGISTER |
| ARCH_RDEST_SAVE | 1 | A FIELD FOR ARCH_DEST FOR HANDLING MISPREDICTED BRANCH |
| EXCEPTION | 1 | INDICATES IF THIS STAGE CONTAINS AN INSTRUCTION WITH AN EXCEPTION |
| PIPE FILE ENTRY | 2 | A POINTER TO WHICH PIPEFILE ENTRY HOLDS THE RESULT |
| VALID | 1 | INDICATES IF THE INSTRUCTION IN THIS STAGE IS VALID |

FIG. 7A

| INFORMATION | SIZE | DESCRIPTION |
|---|---|---|
| STAGE | 2 | INDICATES WHICH STAGE THE INSTRUCTION IS IN. |
| RDEST | 6 | INDICATES WHICH DESTINATION THIS INSTRUCTION WILL WRITE. |
| REDEST_VALID | 1 | INDICATES IF A DESTINATION WILL BE WRITTEN. |
| REDEST_CREG_VALID | 1 | INDICATES THAT THE DESTINATION IS A CONTROL REGISTER |
| STAGE_RDY | 2 | INDICATES WHICH STAGE WILL WRITE THE DESTINATION |
| LSU | 1 | INDICATES IF THIS STAGE CONTAINS AN LSU INSTRUCTION |
| BR | 1 | INDICATES IF THIS STAGE CONTAINS AN BR INSTRUCTION |
| IMU_STALL_MAC | 1 | INDICATES IF THIS STAGE CONTAINS AN IMU-FORWARDING MAC-TYPE INSTRUCTION |
| IMU_STALL_MUL | 1 | INDICATES IF THIS STAGE CONTAINS AN IMU-FORWARDING MUL-TYPE INSTRUCTION |
| EXCEPTION | 1 | INDICATES IF THIS STAGE CONTAINS AN INSTRUCTION WITH AN EXCEPTION |
| VALID | 1 | INDICATES IF THE INSTRUCTION IN THIS STAGE IS VALID |
| PIPE FILE ENTRY | 2 | A POINTER TO WHICH PIPEFILE ENTRY HOLDS THE RESULT |

*FIG. 7B*

MECHANISM FOR FAST ACCESS TO CONTROL SPACE IN A PIPELINE PROCESSOR

BACKGROUND OF THE INVENTION

1. Field of the Invention

The present invention relates in general to microprocessors and, more particularly, to a system, method, and mechanism providing low latency access to control registers in a pipeline processor.

2. Relevant Background

Computer programs comprise a series of instructions that direct a data processing mechanism to perform specific operations on data. These operations including loading data from memory, storing data to memory, adding, multiplying, and the like. Data processors, including microprocessors, microcontrollers, and the like include a central processing unit (CPU) comprising one or more functional units that perform various tasks. Typical functional units include a decoder, an instruction cache, a data cache, an integer execution unit, a floating point execution unit, a load/store unit, and the like. A given program may run on a variety of data processing hardware.

Early data processors executed only one instruction at a time. Each instruction was executed to completion before execution of a subsequent instruction was begun. Each instruction typically requires a number of data processing operations and involves multiple functional units within the processor. Hence, an instruction may consume several clock cycles to complete. In serially executed processors each functional unit may be busy during only one step, and idle during the other steps. The serial execution of instructions results in the completion of less than one instruction per clock cycle.

As used herein the term "data processor" includes complex instruction set computers (CISC), reduced instruction set computers (RISC) and hybrids. A data processor may be a stand alone central processing unit (CPU) or an embedded system comprising a processor core integrated with other components to form a special purpose data processing machine. The term "data" refers to a digital or binary information that may represent memory addresses, data, instructions, or the like.

In response to the need for improved performance several techniques have been used to extend the capabilities of these early processors including pipelining, superpipelining, and superscaling. Pipelined architectures attempt to keep all the functional units of a processor busy at all times by overlapping execution of several instructions. Pipelined designs increase the rate at which instructions can be executed by allowing a new instruction to begin execution before a previous instruction is finished executing. A simple pipeline may have only five stages whereas an extended pipeline may have ten or more stages. In this manner, the pipeline hides the latency associated with the execution of any particular instruction.

The goal of pipeline processors is to execute multiple instructions per cycle (IPC). Due to pipeline hazards, actual throughput is reduced. Pipeline hazards include structural hazards, data hazards, and control hazards. Structural hazards arise when more than one instruction in the pipeline requires a particular hardware resource at the same time (e.g., two execution units requiring access to a single ALU resource in the same clock cycle). Data hazards arise when an instruction needs as input the output of an instruction that has not yet produced that output. Control hazards arise when an instruction changes control information, such as the program counter (PC), because execution cannot continue until the target instruction from the new PC is fetched.

When hazards occur, the processor must stall or place "bubbles" (e.g., NOPs) in the pipeline until the hazard condition is resolved. This increases latency and decreases instruction throughput. As pipelines become longer, the likelihood of hazards increases and the latency penalty paid to handle hazards increases. Hence, an effective mechanism for handling hazard conditions is important to achieving the benefits of deeper pipelines.

Control registers are used to hold scalar state information that controls the execution of instructions in the processor. They are accessed through a control register file. The resources committed to storing this information are sometimes referred to as the "control space". The size and number of control registers in a processor is largely implementation independent. Because control space is accessed at every context switch, there must be a uniform, low latency mechanism for accessing (e.g., reading from and writing to) the control registers.

SUMMARY OF THE INVENTION

A control space access instruction includes a first field containing a source register specifier and a second field containing a destination register specifier. In the case of a read instruction, the source register specifier addresses a control register while the destination register specifier addresses a general purpose register. In the case of a write operation, the source register specifier addresses a general-purpose register while the destination register specifier addresses a control register. A "global operand address bus" is used to index into a register file to address a particular register. A "global operand data bus" is used to communicate data values with the execution stages of a pipeline processor. The decode stage of the pipeline processor is configured to decode the first and second fields and place the decoded contents on the global operand address bus. While the instruction remains in decode the source operand addressed by the source register specifier of the first instruction field is read. The source operand is placed on the global operand data bus. In the meantime, the destination register specifier along with the instruction type is stored into a snapshot file to be used during a writeback stage. During the execution stage, the source operand passes through the execution unit, is optionally sign-extended, and is placed on a result bus. It is then latched into a pipefile at the end of the execution stage and written into the destination register specified by the second instruction field during the writeback stage using the saved destination register specifier in the snapshot file.

Briefly stated, the present invention involves a method for low latency access to the control space. A pipeline processor executes instructions in multiple stages including a decode stage, one or more execution stages, and a writeback stage. A control space access instruction includes a first field containing a control register specifier and a second field containing a general purpose register specifier. The decode stage is configured to decode the first and second fields and place the decoded contents on a global operand bus. The specified control register is addressed from the global operand bus while the access instruction is in decode. In the case of a read instruction, the addressed control register places its contents on the global operand bus while the instruction remains in decode. In the case of a write instruction, the general purpose register is addressed during the execution stage and its contents placed on the global operand bus during the writeback stage such that the contents of the addressed general purpose register are moved to the addressed control register during the writeback stage.

The present invention also involves a data processor having a plurality of execution pipeline stages where each stage accepts a plurality of operand inputs selected from a global operand bus and generates a result. A results bus distributes the generated results from each of the execution pipeline stages throughout the plurality of pipeline stages. A multiplexor associated with each execution pipeline stage operates to selectively couple the results bus to an operand input of the associated execution pipeline stages. . A control space access instruction is executed by identifying a first field containing a control register specifier and a second field containing a general purpose register specifier. The first and second fields are decoded and the decoded contents are placed on a global operand bus. The specified control register is addressed from the global operand bus while the access instruction is in decode. In the case of a read instruction, the addressed control register places its contents on the global operand bus while the instruction remains in decode. In the case of a write instruction, the general purpose register is addressed during the execution stage and its contents placed on the global operand bus during the writeback stage such that the contents of the addressed general purpose register are moved to the addressed configuration register during the writeback stage.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 7A and FIG. 7B show exemplary a snapshot register entries in accordance with embodiments of the present invention.

DETAILED DESCRIPTION OF THE PREFERRED EMBODIMENTS

The present invention involves data forwarding in a pipeline data processor such as an embedded processor, a microprocessor, or microcontroller. Data forwarding involves making internal data objects and results generated by instructions that have not yet completed execution available for use by other instructions. This process involves both detecting when data forwarding will be possible and then configuring the execution pipeline stage hardware to use data forwarded from other pipeline stage result(s) rather than from instruction-specified registers and resources. In particular, data forwarding is used to detect and avert hazard conditions that might stall or slow the pipeline, and configure data paths to forwards operands efficiently amongst execution units, handle exception conditions efficiently and precisely, and similar control operations.

Figure 1:
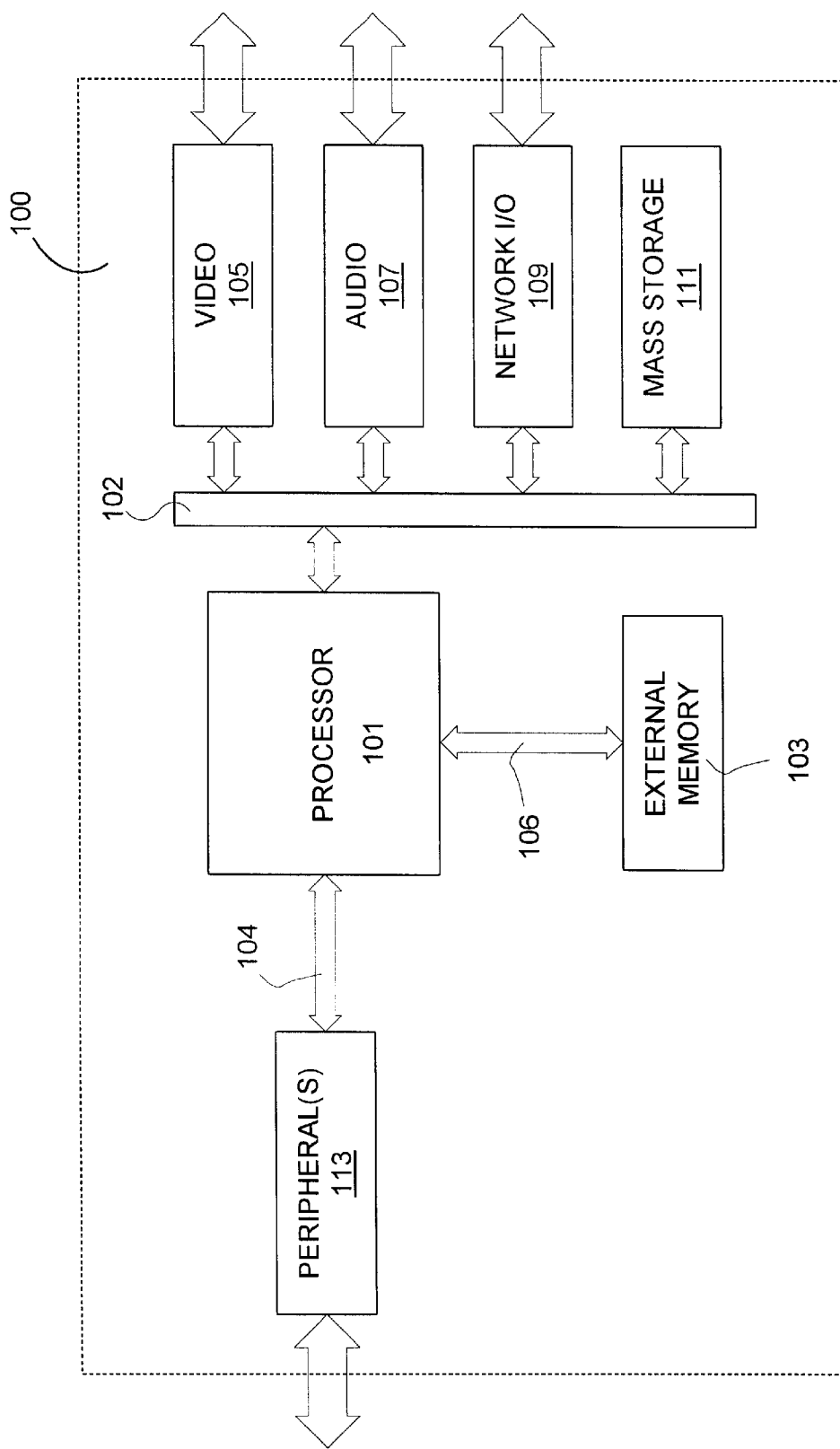
FIG. 1 shows in block diagram form a computer system incorporating an apparatus and system in accordance with the present invention.

Any system is usefully described as a collection of processes or modules communicating via data objects or messages as shown in FIG. 1. The modules may be large collections of circuitry whose properties are somewhat loosely defined, and may vary in size or composition significantly. The data object or message is a communication between modules that make up the system. To actually connect a module within the system it is necessary to define an interface between the system and the component module.

The present invention is illustrated in terms of a media system 100 shown in FIG. 1. Media system 100 comprises, for example, a "set-top box" for video processing, a video game controller, a digital video disk (DVD) player, and the like. Essentially, media system 100 is a special purpose data processing system targeted at high throughput multimedia applications. Features of the present invention are embodied in processor 101 that operates to communicate and process data received through a high speed bus 102, peripheral bus 104, and memory bus 106.

Video controller 105 receives digital data from system bus 102 and generates video signals to display information on an external video monitor, television set, and the like. The generated video signals may be analog or digital. Optionally, video controller may receive analog and/or digital video signals from external devices as well. Audio controller 107 operates in a manner akin to video controller 105, but differs in that it controls audio information rather than video. Network I/O controller 109 may be a conventional network card, ISDN connection, modem, and the like for communicating digital information. Mass storage device 111 coupled to high speed bus 102 may comprise magnetic disks, tape drives, CDROM, DVD, banks of random access memory, and the like. A wide variety of random access and read only memory technologies are available and are equivalent for purposes of the present invention. Mass storage 111 may include computer programs and data stored therein. In a particular example, high speed bus 102 is implemented as a peripheral component highway (PCH)/peripheral component interconnect (PCI) industry standard bus. An advantage of using an industry standard bus is that a wide variety of expansion units such as controller's 105, 107, 109 and 111 are readily available.

Peripherals 113 include a variety of general purpose I/O devices that may require lower bandwidth communication than provided by high speed bus 102. Typical I/O devices include read only memory (ROM) devices such as game program cartridges, serial input devices such as a mouse or joystick, keyboards, and the like. Processor 101 includes corresponding serial port(s), parallel port(s), printer ports, and external timer ports to communicate with peripherals 113. Additionally, ports may be included to support communication with on-board ROM, such as a BIOS ROM, integrated with processor 101. External memory 103 is typically required to provide working storage for processor 101 and may be implemented using dynamic or static RAM, ROM, synchronous DRAM, or any of a wide variety of equivalent devices capable of storing digital data in a manner accessible to processor 101.

Figure 2:
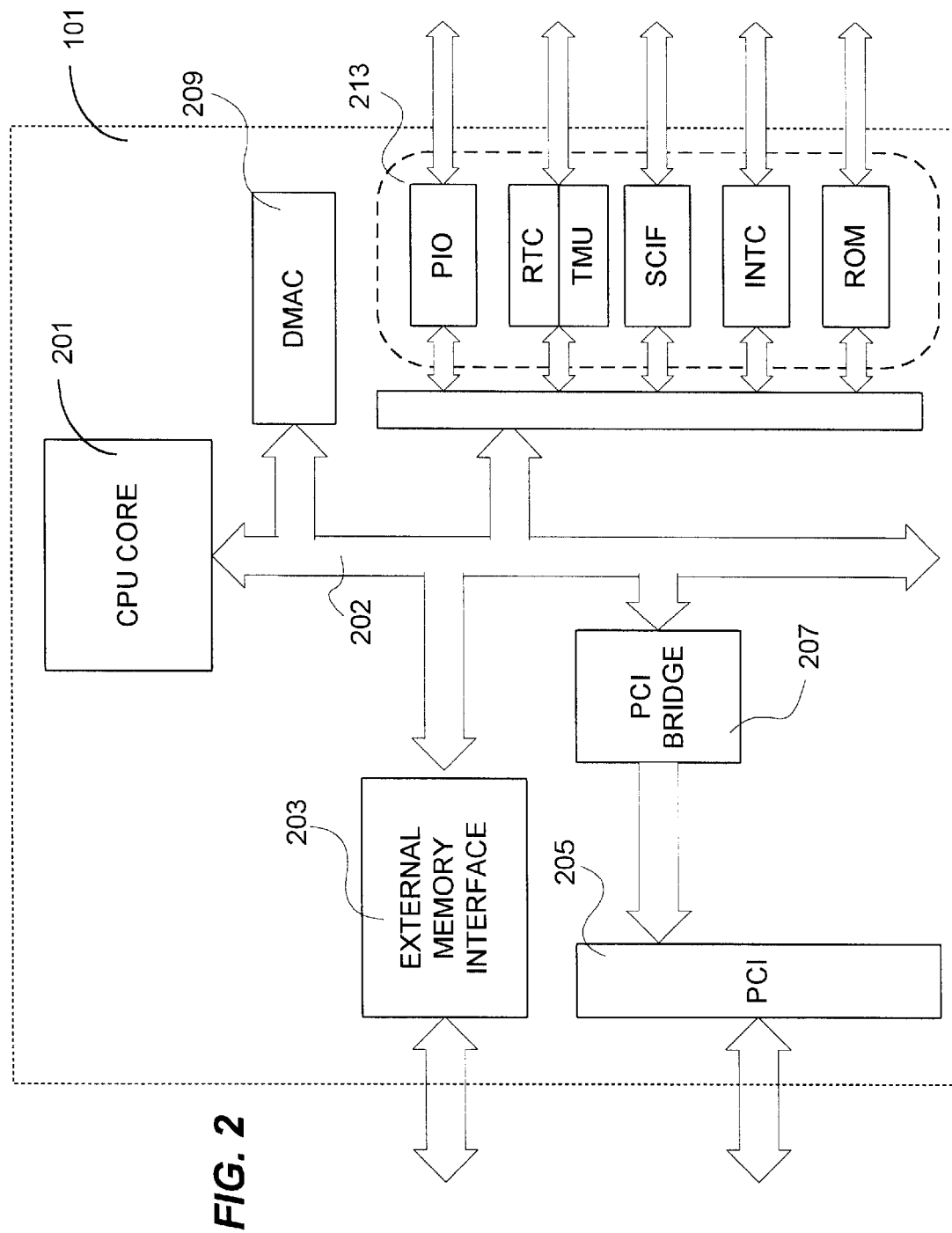
FIG. 2 shows a processor in block diagram form incorporating the apparatus and method in accordance with the present invention.

Processor 101 is illustrated in a greater detail in the functional diagram of FIG. 2. One module in a data processing system is a central processor unit (CPU) core 201. The CPU core 201 includes, among other components execution resources (e.g., arithmetic logic units, registers, control logic) and cache memory. These functional units, discussed in greater detail below, perform the functions of fetching instructions and data from memory, preprocessing fetched instructions, scheduling instructions to be executed, executing the instructions, managing memory transactions, and interfacing with external circuitry and devices.

CPU core 201 communicates with other components shown in FIG. 2 through a system bus 202. In the preferred implementation system bus 202 is a proprietary, high-speed network bus using packet technology and is referred to herein as a "super highway". Bus 202 couples to a variety of system components. Of particular importance are components that implement interfaces with external hardware such as external memory interface unit 203, PCI bridge 207, and peripheral bus 204.

The organization of interconnects in the system illustrated in FIG. 2 is guided by the principle of optimizing each interconnect for its specific purpose. The bus system 202 interconnect facilitates the integration of several different types of sub-systems. It is used for closely coupled sub-systems which have stringent memory latency/bandwidth requirements. The peripheral subsystem 204 supports bus standards which allow easy integration of hardware of types indicated in reference to FIG. 1 through interface ports 213. PCI bridge 207 provides a standard interface that supports expansion using a variety of PCI standard devices that demand higher performance that available through peripheral port 204. The system bus 202 may be outfitted with an expansion port which supports the rapid integration of application modules without changing the other components of system 101. External memory interface 203 provides an interface between the system bus 202 and the external main memory subsystem 103 (shown in FIG. 1). The external memory interface comprises a port to system bus 202 and a DRAM controller.

Figure 3:
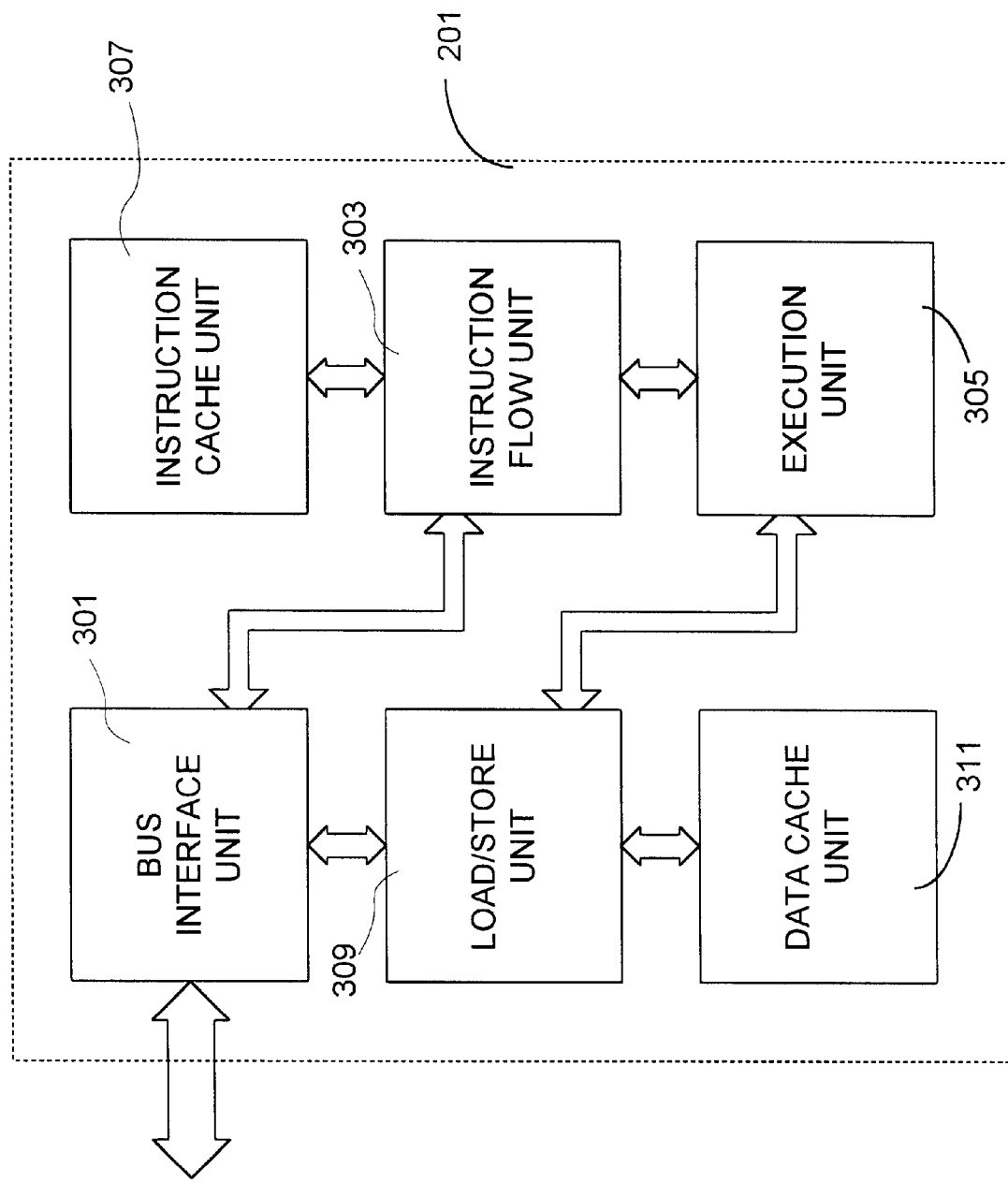
FIG. 3 Illustrates a CPU core useful in the implementation of the processor and system shown in FIG. 1 and FIG. 2 in accordance with the present invention.

CPU core 201 can be represented as a collection of interacting functional units as shown in FIG. 3. These functional units, discussed in greater detail below, perform the functions of fetching instructions and data from memory, preprocessing fetched instructions, scheduling instructions to be executed, executing the instructions, managing memory transactions, and interfacing with external circuitry and devices.

A bus interface unit (BIU) 301 handles all requests to and from the system bus 202 and external memory. An instruction flow unit (IFU) 303 is the front end of the CPU pipe and controls fetch, predecode, decode, issue and branch operations in the preferred embodiment. In accordance with the preferred embodiment, IFU 303 includes a number of components shown in FIG. 4 that cooperate to implement features of the present invention. However, it is contemplated that the inventive features of the present invention may be usefully embodied in a number of alternative processor architectures that will benefit from the performance features of the present invention. Accordingly, these alternative embodiments are equivalent to the particular embodiments shown and described herein.

An execution unit 305 handles all integer and multimedia instructions. The main CPU datapath includes an instruction cache unit (ICU) 307 implements an instruction cache (Icache not shown) and an instruction translation lookaside buffer (ITLB, not shown). Load store unit (LSU) 309 handles all memory instructions. A data cache control unit (DCU) 311 includes a data cache (Dcache, not shown) and a data translation lookaside buffer (DTLB, not shown). Although the present invention preferably uses separate data and instruction caches, it is contemplated that a unified cache can be used with some decrease in performance. In a typical embodiment, the functional units shown in FIG. 2, and some or all of cache memory 105 may be integrated in a single integrated circuit, although the specific components and integration density are a matter of design choice selected to meet the needs of a particular application.

Because of the sequencing role within the CPU core 201, IFU 303 interfaces with almost every other functional unit. The interface between IFU 303 and BIU 301 initiates the loading of instructions into the instruction cache. The interface between IFU 303 and ICU 307 provides the flow of instructions for execution. The interface between IFU 303 and IMU 305 and LSU 309 provides the paths for sending/receiving instructions, operands, results, as well as the control signals to enable the execution of instructions. In addition to these interfaces, IFU 303 may also receive external interrupt signals from an external interrupt controller (shown in FIG. 2), which samples and arbitrates external interrupts. IFU 303 will then arbitrate the external interrupts with internal exceptions and activates the appropriate handler to take care of the asynchronous events.

Figure 4:
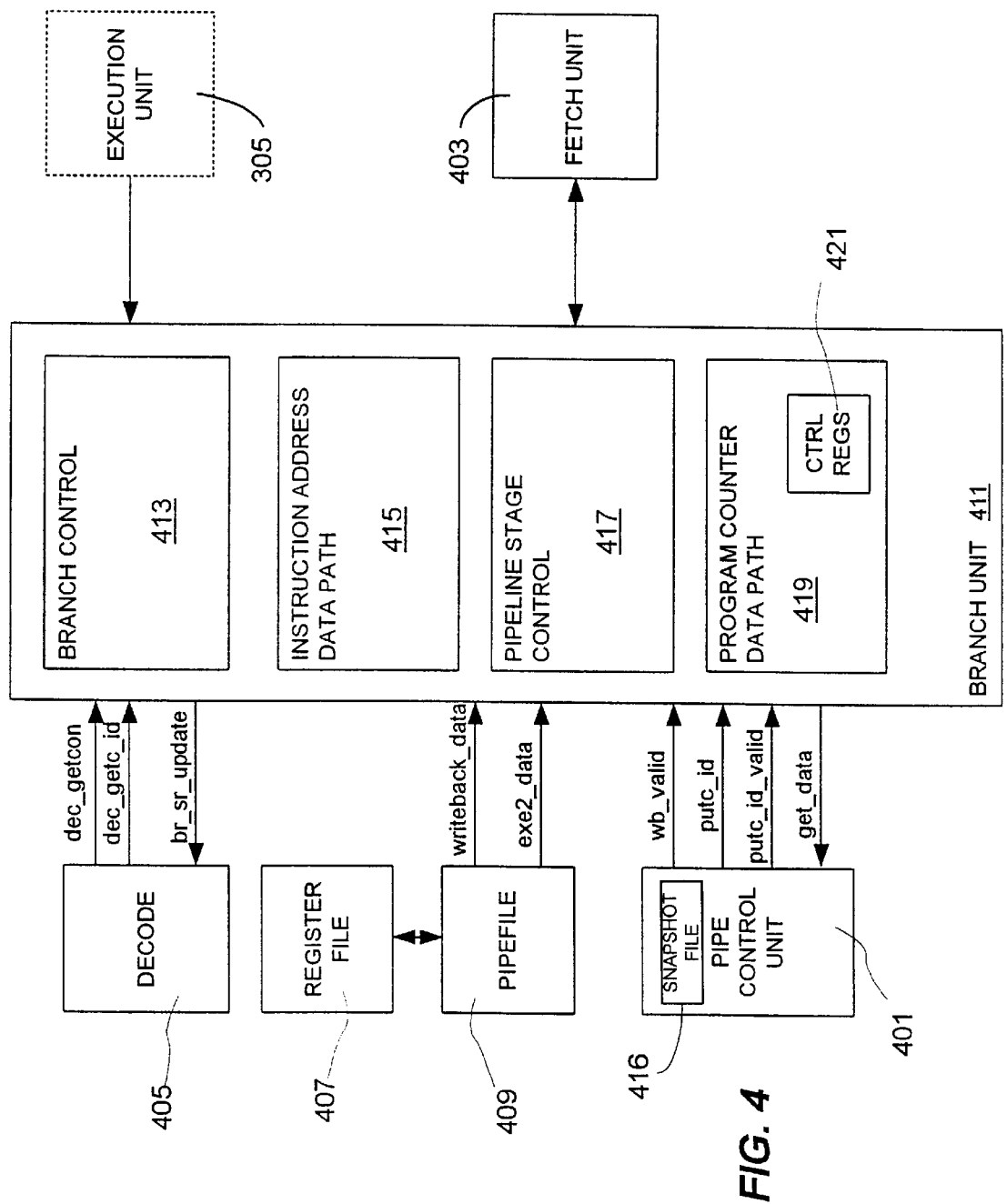
FIG. 4 shows an instruction fetch unit in which features of the present invention are embodied in a particular implementation.

FIG. 4 shows hardware resources within IFU 303 including a branch unit 411 and a decoder 405 in accordance with the present invention. FIG. 4 shows a simplified IFU block diagram with the internal blocks as well as some external interfacing units. As shown in FIG. 4, IFU 303 can be divided into the following functional blocks according to their functions: the fetch unit (FE) 403, the branch unit (BR) 411, the decode unit 405, the pipe control unit 401, and the operand file unit comprising register file 407 and pipe file 409.

IFU 303 functions as the sequencer of the CPU core 201 in accordance with the present invention. It coordinates the flow of instructions and data within the core 201 as well as merges the external events with the core internal activities. Its main functions are to fetch instructions using fetch unit 403 and decode the instructions in decoder 405. IFU 303 checks for instruction inter-dependency, reads the operands from the register file 407 and directs the decoded instructions and the operands to the execution units (e.g., execution unit(s) 305). In addition, IFU 303 couples to BIU :301 (shown in FIG. 3) on instruction cache misses to fill the instruction cache with the missing instructions from external memory.

Branch unit 411 handles all branch related instructions. It receives the decoded branch instructions from decoder 405, determines whether branch condition and target address are known, and proceeds to resolve/predict the branch. In operation, if branch condition is unknown, branch unit 411 may predict the branch condition based on a hint bit or color code optionally included in the branch instruction, or based on some other prediction algorithm. The predicted instruction will then be fetched and decoded. In some implementations, the predicted instruction may be fetched and decoded before the branch condition is resolved to improve performance, although the preferred implementations hold speculatively decoded instructions in the decode stage until branch unit 411 determines that the prediction is correct. Similarly, if the target address is not known when a branch instruction is decoded, the branch instruction will be held in the decode stage until the target address becomes ready.

Control registers 421 are implemented in branch unit 411. The architecture of the exemplary implementation defines sixty-four, 64-bit control registers. These control registers provide a uniform mechanism for accessing the state used to control the CPU. In the particular example the architecture provides two instructions, GETCON and PUTCON, to access the control registers 421. Both GETCON and PUTCON instruction words include a first field (CR_ID) specifying one of the control registers and a second field specifying one of the general purpose registers (R_ID). GETCON operates to move data from the specified control register to the specified general register. PUTCON operates to move data from the specified general register to the specified control register. Details of the implementation of these instructions are described hereinbelow.

Because all branch target instruction addresses are pre-computed by prepare-to-branch instructions in the preferred embodiment, there is a pre-existing datapath between the execution unit 305, pipefile 409, and the branch unit 413. This preexisting datapath is sized to transfer the target address from the execution unit 305 to the branch unit 413. Because branch performance is crucial to overall system performance this datapath is designed to minimize transfer delay. The present invention takes advantage of this datapath by reusing the datapath to transfer control register values between the control register 421 within branch unit 413 and the register file 407, which connects to pipefile 409.

Pipe file 409 operates to collect results from the execution units, and writes them back to the register file 407. Once instructions are decoded, pipe control unit 401 monitors their execution through the remaining pipe stages. The main function of pipe control unit 401 is to ensure that instructions are executed smoothly and correctly that (i) instructions will be held in the decode stage until the source operands are ready or can be ready when needed, (ii) that synchronization and serialization requirements imposed by the instruction as well as internal/external events are observed, and (iii) that data operands/interim results are forwarded correctly. Data forwarding and hazard detection logic is implemented within the pipe control unit 401 in the preferred implementation.

Another major function of the pipe control unit 401 is to handle non-sequential events such as instruction exceptions, external interrupts, resets, etc. Under normal execution condition, this part of the pipe control unit 401 is always in the idle state. It wakes up when an event occurs. The pipe control unit 401 receives the external interrupt/reset signals from the external interrupt controller (shown in FIG. 2). It receives internal exceptions from many parts of the CPU core 201. In either case, the pipe control unit 401 will clean up the pipeline, and then informs the branch unit 411 to save the core state and branches to the appropriate handler. When multiple exceptions and interrupt occur simultaneously, the pipe control unit 401 arbitrates between them according to the architecturally defined priority. The pipe control unit 401 also looks at internal configuration and control registers to determine whether and when an interrupt or exception should be blocked.

The operand file unit implements the architecturally defined general purpose register file 407. In addition, it also implements a limited version of a reorder buffer called "pipefile" 409 for storing and forwarding interim results that are yet to be committed to architectural registers. Because CPU core 201 is principally directed at in-order execution, there is only a small window of time that execution results may be produced out-of-order. The present invention implements a simplified version of the reorder buffer that allows interim results to be forwarded as soon as they are produced, while avoiding the expensive tag passing/matching mechanism usually associated with a reorder buffer. The operand file implements the data path portion of this pipe file. The control is implemented in the pipe control unit 401.

Figure 5:
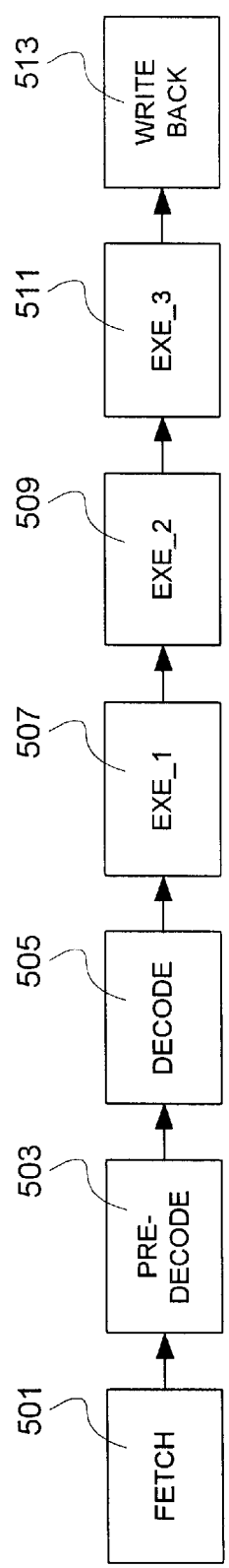
FIG. 5 illustrates an exemplary execution pipeline in accordance with a specific embodiment of the present invention.
Figure 6:
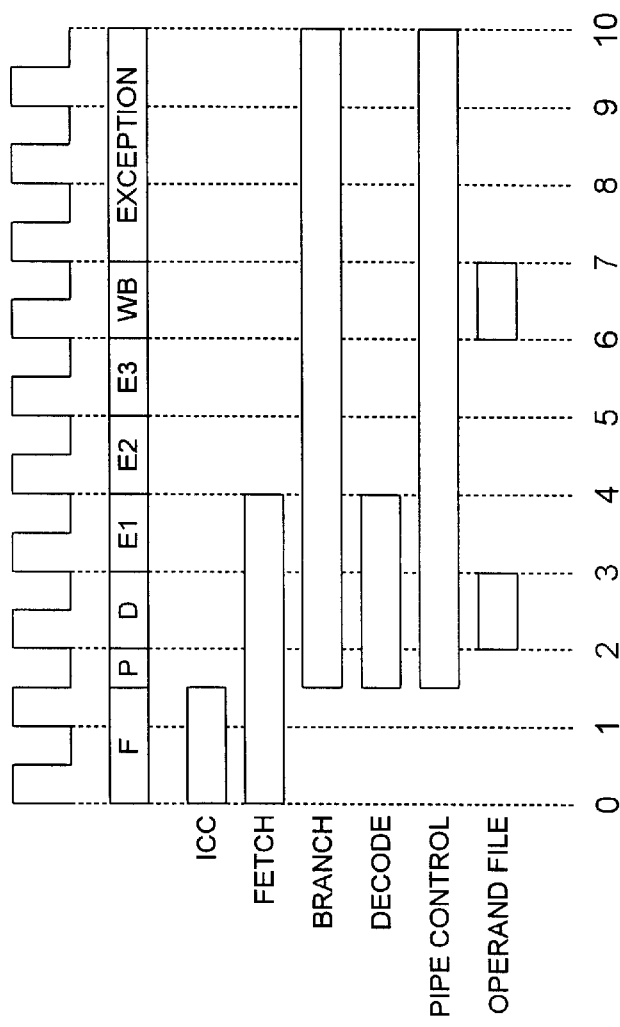
FIG. 6 illustrates comparative pipeline timing for the execution pipeline shown in FIG. 5.

FIG. 5 and FIG. 6 illustrate an example execution pipeline in accordance with the present invention. The particular example is a scalar (i.e., single pipeline), single issue machine. The implementation in FIG. 5 and FIG. 6 includes three execution stages. Many instructions however execute in a single cycle. The present invention implements features to enable comprehensive forwarding within the pipeline to achieve a high instruction throughput.

In the pre-decode stage 503 the instruction cache access which was initiated in the previous cycle is completed and the instruction is returned to IFU 303 where it can be latched by mid-cycle. An instruction may spend from 1 to n cycles in stage 503 depending on downstream pipeline instructions. In the second half of stage 503, some pre-decoding of the instruction will be carried out. Decode stage 505 handles the full instruction decode, operand dependency checks and register file read and instruction issue to the execution units.

The first execution stage 507 implements the execution of all single cycle integer instructions as well as the address calculation for memory and branch instructions. The second execution stage 509 implements the second cycle of execution for all multicycle integer/multimedia instructions. Additionally it corresponds to the second cycle for load instructions. The third execution stage 511 implements the third cycle of execution for all multicycle integer/multimedia instructions and corresponds to the completion cycle for load instructions. Write back stage 513 is where all architectural state modified by an instruction (e.g. general purpose register, program counter etc.) is updated. The exception status of the instruction arriving in this stage or any external exception can prevent the update in this stage.

The pipe control unit 401 performs a number of operations in handling the instruction flow. An important feature of the pipe control unit 401 is the pipeline snapshot file 416 (shown in FIG. 4) implemented within pipe control unit 401. Snapshot file 416 may be implemented as a lookup table having a table entry 701 (shown in FIG. 7) corresponding to each execution stage in the pipeline. The snapshot file 416 provides a central resource for all pipeline control operations such as dependency checks, operand forwarding, exception handling, and the like. In a particular implementation, snapshot file 416 includes four entries corresponding to the three execution pipeline stages and the write back pipeline stage.

The particular execution of the GETCON and PUTCON instructions in accordance with the present invention is described in reference to FIG. 4, FIG. 5 and FIG. 6. When a GETCON instruction occurs, decoder 405 first decodes the control register access address in decode. For GETCON, it will access the control register addressed in decode by applying the "dec_getcon" and "dec_getc_id" to branch unit 411. Branch unit 411 multiplexes the contents of the addressed control register onto the operand busses using the "get_data" line to pipeline control 401 shown in FIG. 4. Pipeline control unit 401 can then execute the GETCON instruction like a more conventional "move-type" instruction (for non-sign-extended accesses) or "add-type" instruction (for sign-extended accesses) by transferring the data from the get_data lines into the general purpose register specified in the GETCON. In the preferred implementation the data from the get_data lines is transferred to an entry in pipefile 409 where it follows the GETCON instruction through the pipeline to writeback. The pipeline file entry is available to other execution resources while the GETCON instruction completes.

When a PUTCON instruction occurs, decoder 405 first decodes the access address in as for the GETCON instruction. The PUTCON is execution preferably serialized which means it executes alone in the pipeline or back serialized which means that the pipeline can have instructions ahead of the PUTCON, but the PUTCON is followed only by NOP or pipeline bubbles until the PUTCON completes through writeback. IFU 303 stalls while this decode is carried out.

After the decoded control register value is supplied to branch unit 411 the PUTCON instruction is passed on to the execution pipeline stages. The specified register file is addressed and the data to be stored is read and transferred to an entry in pipefile 409 from the specified register file during the execution and/or writeback stages. Like a GETCON instruction, the PUTCON is executed in a manner analogous to a conventional register move instruction (often having a mnemonic "MOV") and uses the same datapath as a MOV instruction. Unlike a MOV instruction, at the writeback stage 513 the writeback to a register is suppressed by the pipe control unit 401. Instead the result value (i.e., the value from the general purpose register) is written to the addressed control register(s) 421 in the branch unit 411

During the writeback stage 513, data from pipefile 409 is forwarded to the branch unit 411 using the writeback_data line shown in FIG. 4. As soon as the contents are available branch unit 411 complete the transfer of the data from the writeback_data to the specified control register and the pipeline stall condition removed. Hence, the earlier the data from the general purpose register is available, the less time the pipeline need be stalled to execute the PUTCON update.

In the preferred implementation the control register update occurs synchronous with the writeback stage of the PUTCON instruction. This implies that the general purpose register file 407 is read while the PUTCON is in the E3 pipe stage 511. A state machine in decoder 405 is desirably provided handle the synchronization of the instruction to the pipe. Snapshot file 701 contains control information for each stage indicating the address of the destination register (RDEST) and indicating that the destination register is a control register (RDEST_CREG_VALID). Pipe control unit 401 uses this information to signal branch unit 411 using the "putc_id"and wb_valid signals. In response, branch unit 411 implements the update of the specified control data from the pipefile 409 provided over the writeback_data line.

FIG. 7A and FIG. 7B show exemplary snapshot files 701 and 702 indicating entries holding metadata describing the instruction execution state at the corresponding pipe stage. As instructions move from one stage to another, their associated snapshot entry moves to the corresponding snapshot entry 701 or 702. The contents of each snapshot entry 701 may be varied to meet the needs of a particular application. The specific examples shown in FIG. 7 correspond to pipeline control operations described hereinbelow. The essential functionality of examples 701 and 702 are similar although the implementation of that essential functionality differs between the examples. In comparing the examples, snapshot file 701 does not include a "STAGE" entry as that is implied by the index of the entry whereas example 702 includes an explicit STAGE entry. The single STAGE_RDY entry of FIG. 7B is implemented using three separate entries (E1_RESULT, E2_RESULT and E3_RESULT) in the example of FIG. 7A. The fields have the function generally described in the figures and additional or fewer fields may be added to meet the needs of a particular application.

Notably, the datapaths used by GETCON and PUTCON are conventional datapaths used in forwarding mechanims, i.e., the global operand bus. These instructions are implemented with minimal increase in hardware yet access is fast with minimal pipeline stalling.

Under normal conditions once an instruction has been issued to an execution unit its entry will progress through each stage of the snapshot file on each clock edge. At the beginning of each execution stage the control for writing the result to the pipefile is generated. This is determined by checking the E1_RESULT, E2_RESULT, and E3_RESULT fields of the current execution stage. For example, if E1_RESULT field is set for the instruction executing in the EXE_1 stage 507, the result from EXE_1 stage 507 will then be written into the pipefile entry indexed by the PIPE_FILE_ENTRY field. Similarly, the result from the EXE_2 and EXE_3 stages will be written into the pipefile 409 when the E2_RESULT and E3_RESULT fields of the corresponding snapshot file entries are set. The write into pipefile 409 will occur even if the EXCEPTION field in snapshot file 702 is set. This is to allow transportation data for exceptions back to the branch unit. Once an instruction reaches write-back, the rdest_valid field also determines if the contents of the pipefile is written back to the architectural register file. Once in write-back, if no exception has occurred, the instruction has completed.

An important feature of the present invention involves handling internal operand forwarding within the pipeline. Because the snapshot entry 701 indicates which pipe stage will produce a result to the pipefile 409, subsequent instructions can reliably use the interim result from the pipefile 409 before it is committed to architectural s-ate. By enabling operand bypass between stages a significant percentage of data hazards can be avoided. This process is called internal operand forwarding.

Figure 8:
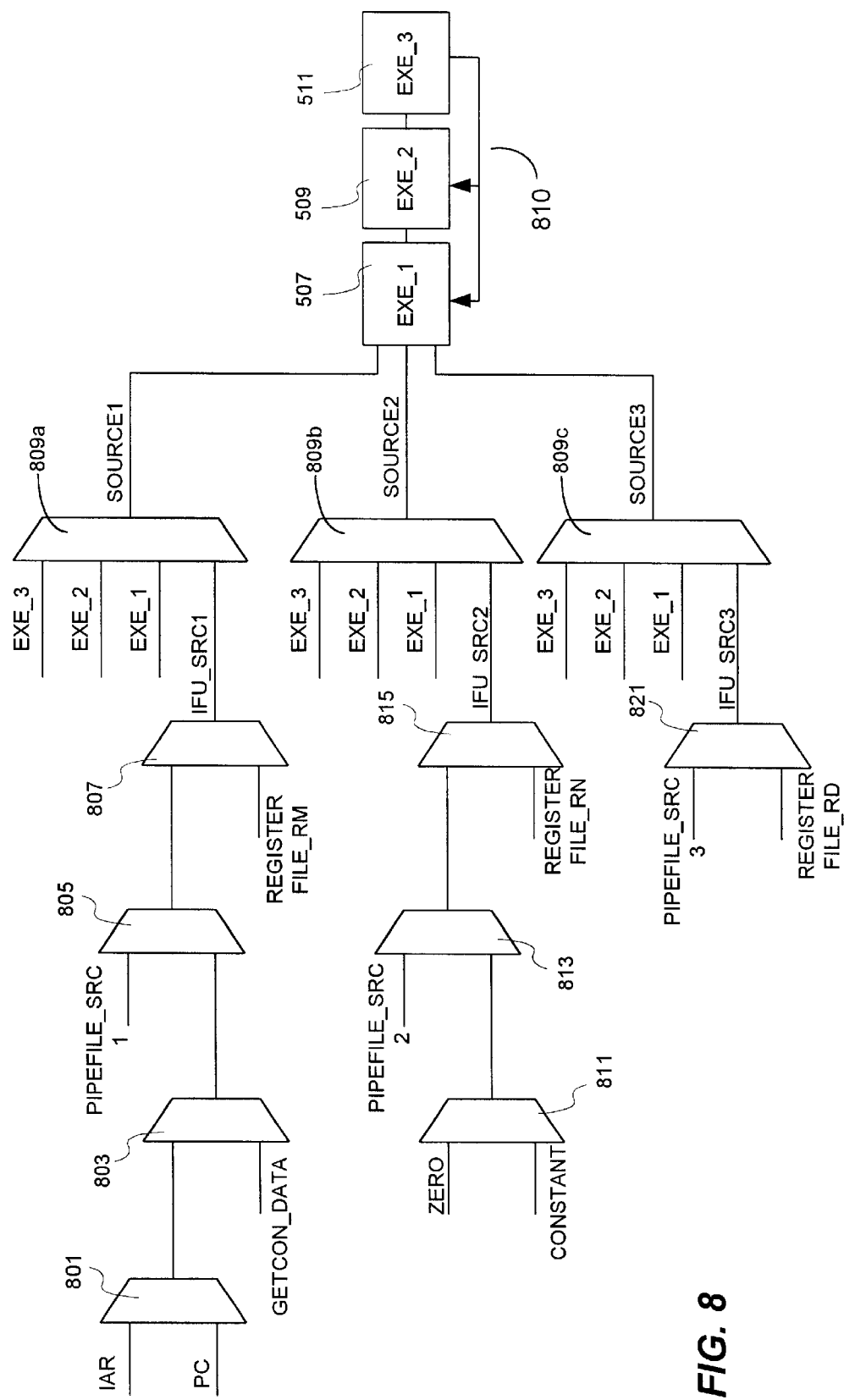
FIG. 8 shows an operand multiplexing mechanism in accordance with an embodiment of the present invention.

When decode indicates that it has a valid instruction the pipe control block determines from the instruction code the source of the operands for the instruction. The present invention enables an operand can be sourced from, for example:

Register operands;
Indirectly forwarded operands through the three pipefile entries;
Directly forwarded operands from the result busses of the associated with the instruction execution pipe stages;
The extended immediate field from the instruction;
The program counter;
The contents of an instruction address register (IAR);
The contents of a control register; and
A tied low constant field;

The above gives up to 12 possible sources of input to some operand. FIG. 8 illustrates an exemplary operand multiplexing ("muxing") mechanism that enables rich sharing of operands within the pipeline. The mechanism shown in FIG. 8 is distributed throughout pipe control unit 401 as described below. The operand multiplexor mechanism of FIG. 8 produces three choices (e.g., IFU_SRC1, IFU_SRC2, IFU_SRC3) for the source operands provided to the first execution stage 507. Each execution stage produces a result (labeled EXE_1, EXE_2, and EXE-3 in FIG. 8) that may be used as a source operand input to the first execution stage 507. Execution stage 507 is associated with a multiplexors 809a–809c for selecting up to three source operands from those available. The specific examples given herein are for purposes of explanation and understanding, and are not a limitation on the actual implementation.

It should also be understood that execution stage 507, 509 and 511 shown in FIG. 8 are representative of all of the hardware resources used in that execution stage as defined by the processor microarchitecture. An execution stage is physically implemented using the hardware resources such as those shown in FIG. 3. The outputs of multiplexors 809 are physically coupled to each of the hardware resources that will use the source operands during its operation.

The multiplexing of these operand sources in the particular example is distributed in the following way:

The program counter (PC), instruction address registers, and control register contents are pre-muxed in the branch unit using multiplexors 801 and 803. All these inputs are available at the start of the cycle.

The decode constant extracted from the instruction and possibly tied high zeroes are pre-muxed in the decode stage using multiplexor 811.

The outputs of the pipefile 409 are muxed with the program counter data and decode constant data respectively in multiplexors 805 and 813.

The register file contents are muxed with the pipefile outputs using multiplexors 807, 815, and 821 to produce source operands which are distributed down the execution datapath (IFU_SRC1, IFU-SRC2, IFU_SRC3 in FIG. 8).

Forwarding of completing results is done locally within the execution datapath as suggested by the connection from the output of EXE_3 stage to the input of multiplexor 809. As the result is being driven back up the datapath from the various stages of execution (imu_result_ex1, _ex2 and _ex3), the result taps back into the multiplexor 809 latch at the input to the execution sub-units. The result is also driven back up to the pipefile for ultimate storage in the register file. Pipe control unit 401 controls the selection of the multiplexor 809 latches.

The LSU ex3 result is muxed with the output of the IMU ex3 result (from the multiplier). This is also controlled by the pipe control unit 401.

In this manner, pipe control unit 401 generates the control signals for multiplexors and execution stage resources. This enables the source operand inputs used by each execution stage to be selected from among a plurality of possible inputs. Of particular significance is that each source operand can be forwarded from the interim results stored in the pipefile if valid results are available in the pipefile. This is useful in handling data hazards in a manner that limits the need to stall the pipeline or fill the pipeline with bubbles while data dependencies resolve.

Figure 9:
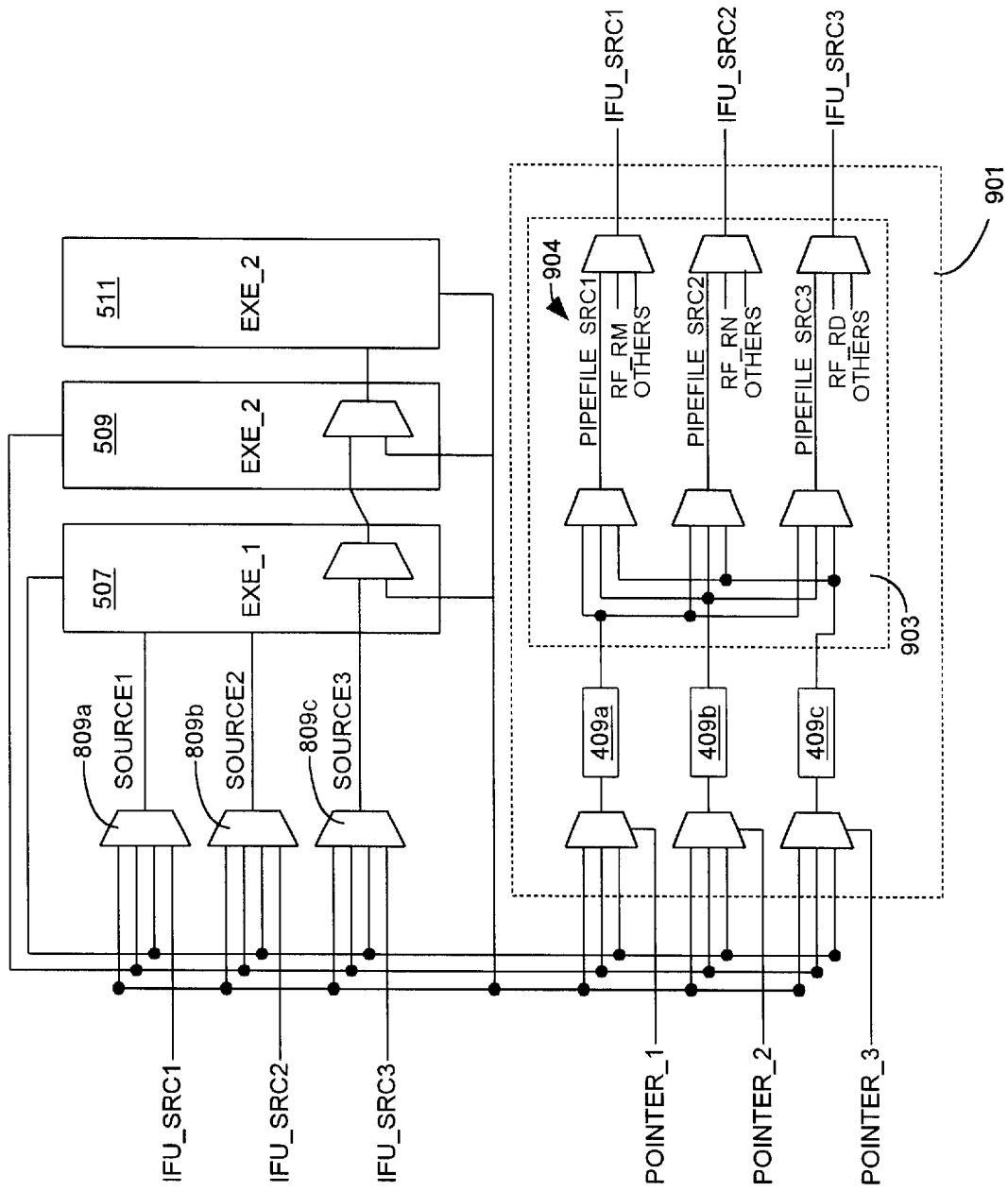
FIG. 9 schematically illustrates internal operand forwarding mechanism in accordance with the present invention.

FIG. 9 that schematically illustrates the execution stages of a pipeline and the operand sources for each stage. Each execution stage (EXE_1, EXE_2 and EXE_3) may generate a result. The specific stage that generates a result for any given instruction will vary from instruction-to-instruction, but is preferably indicated in the "stage_rdy" field of the snapshot file entry 702 or the E1_RESULT, E2_RESULT and E3_RESULT fields described hereinbefore. Each source operand can be taken from the execution unit's own result output. FIG. 9 shows an operand bus comprising IFU_SRC1, IFU_SRC2 and IFU_SRC3 (determined as shown in FIG. 8) and a results bus comprising EXE_1_RESULT, EXE_2_RESULT and EXE_3_RESULT. The results bus carries results to appropriate entries in pipefile 409.

In the embodiment shown in FIG. 9 each execution stage corresponds to a specific entry in the pipe file 409 (e.g., EXE_2 corresponds to pipefile entry 409A, EXE_3 stage 509 corresponds to entry 409B). Results are written from the result bus into pipefile 409 according to the "stage_rdy" value in the snapshot register (FIG. 7A) or the E1_RESULT through E3_RESULT entries (FIG. 7B) as described hereinbefore. Pipefile 409A takes the EXE_1 result and can forward its contents when the instruction that produces the result is in the EXE_2 stage. Similarly, pipefile entry 409B takes the EXE_2 result and 409C takes the EXE_3 result respectively. Otherwise, results are moved sequentially from entry 409A to 409B to 409C. Entry 409C corresponds to the write back pipe stage. Assuming the snapshot register entry 701 corresponding to the instruction in the write back stage is valid and does not indicate an exception, the value stored in pipefile stage 409 is copied to the appropriate register in register file 407.

Significantly, the operands for each execution stage can be selected from either the operand bus or the results bus. Hence, a result that is ready in EXE_1 will be driven onto the EXE_1_RESULT line and can be used as an operand on the following cycle in the second and third execution stages before being written to either register file 407 or the pipefile 409. Similarly, a result determined in EXE_3 can be used on the next clock cycle as an operand for an instruction executing in the first execution stage (EXE_1). This enables the instruction to be issued to EXE_1 without delays or pipeline bubbles normally associated with waiting for the EXE_3_RESULT to be written out to a register or rename register.

Furthermore, execution stage 507 can use its own output as well as the outputs of stages 509 and 511 as an operand for the next cycle. This is done, for example, by selecting EXE_1_RESULT, EXE_2_RESULT or EXE_3_RESULT as one of its operand inputs. This is particularly useful for accumulate-type operations where the destination register is used in a series of instructions to hold an accumulating result. Without this feature, pipeline bubbles would likely be inserted between accumulate instructions thereby reducing throughput significantly. Using this feature, the decoder can issue accumulating type instructions one-after-another.

The results are coupled to a corresponding selector unit 901. Each selector selectively couples the result to one of the result bus lines. Each selector is controlled by, for example, the pointer value (labeled POINTER_1, POINTER_2 and POINTER_3 in FIG. 9) corresponding to that pipe stage. The pointer values are determined from the PIPE_FILE_ENTRY and E1_RESULT, E2_RESULT and E3_RESULT fields of snapshot entry 701. Alternatively, the pointer value 903 may be stored in the snapshot file entry 701 as described hereinbefore, or may be stored in a separate register that operates in a manner such that the pointer value remains associated with a particular instruction as the instruction moves through the pipeline. The result is written to the specified pipefile entry 409a–409c.

Pipefile 409 preferably comprises dual ported memory structure so that the contents of any entry 409a–409c can be written to and/or read out at any time. The memory within pipefile 409 is typically implemented using CMOS or BICMOS static random access memory (SRAM) technology using four or more transistors per stored bit. A multiplexor set 903 selectively couples the data stored in pipefile entries 409a–409c to appropriate lines on a pipefile bus 904. The pipefile bus 904 provides values to the multiplexing mechanism shown in FIG. 8, for example. Multiplexor set 903 is controlled by pipe control unit 401 to couple appropriate bus lines to corresponding entries 409a–409c in pipefile 409.

As a particular example, assume an instruction that generates its result in EXE_1 and the pointer values are set such that the EXE_1 result is written to pipefile entry 409b. From pipefile entry 409b the result can be multiplexed onto any of the IFU_SRC lines by appropriate settings in multiplexor set 903. On the next pipe cycle, the example instruction will move to pipe stage EXE_2, while pipefile entry 409b remains unchanged. In this manner, a result needs only be written to the results bus one time while remaining continuously available for forwarding while the instruction remains in the pipeline. the hundreds of transistors used to store the value in entry 409b do not have to be switched until after the value is written back and the pipe file entry is reassigned to an instruction in the decoder.

It is contemplated that the functionality of multiplexor 903 may be implemented in a variety of ways depending on the level of operand forwarding needed in a particular implementation. For example, if operand forwarding from the pipefile is not needed, there would be no corresponding need to generate the PIPEFILE_SCR1, PIPEFILE_SCR2 and PIPEFILE_SCR3 lines. The writeback line is controlled by the writeback stage pointer and selects one of the pipefile entries for writeback to an architectural register in register file 407.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer. readable code embodied therein to perform precise architectural update in an emulated or simulated out-of-order machine. Accordingly, these and other variations are equivalent to the specific implementations and embodiments described herein.

What is claimed is:

1. A computing system comprising:
    a memory;
    a system bus coupled to the memory and providing ports for coupling to additional system components;
    a processor coupled to the memory through the system bus, the processor comprising:
        a branch unit configured to handle branch instructions;
        a plurality of control registers within the branch unit;
        a decoder having a datapath coupled to the branch unit, the decoder configured to use the datapath to send control register address information to the branch unit during the decode stage in response to receiving a control register access instruction;
        a general purpose register file having a plurality of entries;
        a snapshot file having an entry for each pipeline stage, the snapshot file entry, containing an identification of a register that will be modified by an instruction in the associated pipeline stage and an indication of whether the register is a control register; and
        a pipe control mechanism coupled to read the snapshot file entries and notify the branch unit when a value from a selected one of the general purpose registers is available to be written back to the control register specified in the snapshot file entry.

2. A processor having low latency access to control registers comprising:
    a branch unit configured to handle branch instructions;
    a plurality of control registers within the branch unit;
    a decoder having a datapath coupled to the branch unit, the decoder configured to use the datapath to send control register address information to the branch unit in response to receipt of a control register access instruction;
    a plurality of execution pipeline stages where each stage accepts a plurality of operand inputs and generates a result;
    a global operand bus distributing the generated results from each of the execution pipeline stages throughout the plurality of pipeline stages, wherein the global operand bus is coupled to the branch unit to transfer values to and from the control registers;
    a general purpose register file having a plurality of general purpose registers;
    a snapshot file having an entry associated with each pipeline stage, the snapshot file entry containing an identification of a register that will be modified by an instruction in the associated pipeline stage and an indication of whether the register is a control register; and
    a pipe control mechanism coupled to read the snapshot file entries and notify the branch unit when a value from a selected one of the general purpose registers is available to be written back to the control register specified in the snapshot file entry.

3. The processor of claim 2 further comprising a multiplexor associated with each execution pipeline stage operative to selectively couple the global operand bus to an operand input of the associated execution pipeline stages.

4. The processor of claim 2 wherein the decoder is further configured to use the datapath to send instruction address information to the branch unit in response to receiving a branch instruction.

5. The processor of claim 2, further comprising a pipefile having a plurality of entries, the pipefile coupled to the global operand bus to hold values transferred to and from the control registers while the control register access instruction is in the execution pipeline stages.

6. The processor of claim 2 further comprising means for transferring a value from a one of the plurality of control registers specified by the control register address information to a selected entry of the general purpose register file in response to the control register access instruction.

7. The processor of claim 2 further comprising means for transferring a value from a selected entry of the general purpose register file to a one of the plurality of control registers specified by the control register address information in response to the control register access instruction.

* * * * *